US010892834B2

(12) United States Patent
Wang et al.

(10) Patent No.: US 10,892,834 B2
(45) Date of Patent: Jan. 12, 2021

(54) METHOD AND SYSTEM FOR DETERMINING SIGNAL STRENGTH FOR A MOBILE DEVICE

(71) Applicant: INTERNATIONAL BUSINESS MACHINES CORPORATION, Armonk, NY (US)

(72) Inventors: Fang Wang, Westford, MA (US); Su Liu, Austin, TX (US); Sushain Pandit, Austin, TX (US); Martin Oberhofer, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/134,480

(22) Filed: Sep. 18, 2018

(65) Prior Publication Data

US 2020/0092019 A1  Mar. 19, 2020

(51) Int. Cl.
*H04B 17/318* (2015.01)
*H04W 16/20* (2009.01)
*H04W 24/10* (2009.01)
*H04W 24/02* (2009.01)
*H04W 4/33* (2018.01)

(52) U.S. Cl.
CPC ............ *H04B 17/318* (2015.01); *H04W 4/33* (2018.02); *H04W 16/20* (2013.01); *H04W 24/02* (2013.01); *H04W 24/10* (2013.01)

(58) Field of Classification Search
CPC ...... H04B 17/318; H04W 4/33; H04W 16/20; H04W 24/02; H04W 24/10
See application file for complete search history.

(56) References Cited

U.S. PATENT DOCUMENTS

| 8,396,470 | B2 | 3/2013 | Wormald |
| 9,420,477 | B2 * | 8/2016 | Cronin ................. H04W 24/02 |
| 10,555,192 | B2 | 2/2020 | Yang et al. |
| 10,674,371 | B2 | 6/2020 | Hoperaft |
| 2004/0180671 | A1 * | 9/2004 | Spain, Jr. .............. H04W 64/00 455/456.1 |

(Continued)

OTHER PUBLICATIONS

"Forecasting Mobile Transmission Reliability Using Crowd-Sourced Cellular Coverage Data"; Martin et al.; 2014 Systems and Information Engineering Design Symposium (SIEDS); Apr. 25, 2014 (Year: 2014).*

(Continued)

*Primary Examiner* — Benjamin H Elliott, IV
(74) *Attorney, Agent, or Firm* — Schmeiser, Olsen & Watts; William H. Hartwell

(57) ABSTRACT

A system and method are provided for predicting a signal strength for a specific location. The method includes operations for predicting mobile device signal strength by building a database of mobile signal information. The mobile signal information includes signal strength for a plurality of mobile devices located at a plurality of three-dimensional, geospatial coordinates and utilizing a plurality of mobile signal providers/carriers. The method predicts, using the database, a signal strength for a particular mobile device at a particular set of three-dimensional, geospatial coordinates utilizing a particular mobile signal provider/carrier and displays the prediction at a specific time.

18 Claims, 12 Drawing Sheets

(56) References Cited

U.S. PATENT DOCUMENTS

| | | | | |
|---|---|---|---|---|
| 2009/0141662 A1* | 6/2009 | Gurney | ............ | H04W 52/0229 370/311 |
| 2011/0217964 A1* | 9/2011 | Matsuo | ............ | G06K 19/07762 455/414.2 |
| 2013/0308470 A1* | 11/2013 | Bevan | ................... | H04W 16/28 370/252 |
| 2014/0162693 A1* | 6/2014 | Wachter | ............... | H04W 4/021 455/456.3 |
| 2015/0018003 A1* | 1/2015 | Zhou | .................... | G01S 5/0242 455/456.1 |
| 2015/0156611 A1* | 6/2015 | Aggarwal | ............ | H04W 64/00 455/456.1 |
| 2015/0195775 A1* | 7/2015 | Wirola | .................... | H04W 8/18 370/338 |
| 2015/0215762 A1* | 7/2015 | Edge | .................... | H04W 8/005 370/338 |
| 2015/0304920 A1* | 10/2015 | Cootey | ................ | H04W 28/18 455/436 |
| 2016/0127209 A1* | 5/2016 | Singh | .................... | H04W 24/02 455/435.2 |
| 2017/0006535 A1* | 1/2017 | Verma | ................... | H04W 74/06 |
| 2017/0010936 A1* | 1/2017 | Daoud | ................. | H04W 40/20 |
| 2017/0201856 A1* | 7/2017 | Wilbur | .............. | G01C 21/3614 |
| 2017/0359796 A1* | 12/2017 | Wirola | ................ | H04W 64/006 |
| 2018/0132060 A1* | 5/2018 | Dhulipalla | ............ | H04W 4/029 |
| 2018/0180704 A1* | 6/2018 | Khan | .................... | G01S 5/0236 |
| 2018/0184303 A1* | 6/2018 | Egner | ................... | H04W 16/18 |
| 2018/0192253 A1* | 7/2018 | Khan | .................... | G01S 5/0236 |
| 2018/0259347 A1* | 9/2018 | Khasis | ............... | G06Q 10/1097 |
| 2019/0025062 A1* | 1/2019 | Young | ................... | G01S 5/0252 |
| 2019/0364492 A1* | 11/2019 | Azizi | .................... | H04W 24/08 |
| 2020/0092019 A1* | 3/2020 | Wang | ..................... | H04W 4/33 |

OTHER PUBLICATIONS 3G and 4G LTE Cell Coverage Map; https://opensignal.com; retrieved from the Internet Jan. 25, 2018; 3 pages.

Capodelup, Donna; 8 reasons why cell phone signals suddenly go bad; https://www.wilsonamplifiers.com/blog/8-reasons-why-cell-phone-signals-suddenly-go-bad/; Nov. 30, 2016; 8 pages.

CellReception: Find a better signal; http://www.cellreception.com; retrieved from the Internet Jan. 25, 2018; 1 page.

GSM roaming and coverage maps; http://maps.mobileworldlive.com; retrieved from the Internet Jan. 25, 2018; 6 pages.

Provide mobile performance insights; http://www.rootmetrics.com/en-US/home; retrieved from the Internet Jan. 25, 2018; 5 pages.

Report Cell Phone Reception Problem; http://deadcellzones.com; retrieved from the Internet Jan. 25, 2018; 6 pages.

Richman, Dan; Crowdsourcing digital signal strength; http://www.nbcnews.com/id/33239992/ns/technology_and_science-wireless/t/crowdsourcing-digital-signal-strength/#.Wgo_qXeZPdQ; Jan. 12, 2009; 4 pages.

Sensorly—Unbiased, Real-World Mobile Coverage; http://www.sensorly.com; retrieved from the Internet Jan. 25, 2018; 5 pages.

SignalMap—Find the Best cell phone coverage in your area; https://www.signalmap.com; retrieved from the Internet Jan. 25, 2018; 2 pages.

T-Mobile Signal Coverage Map, Cricket Signal Map, Ultra Mobile Signal Map; https://www.t-mobile.com/coverage/coverage-map, https://www.cricketwireless.com/map.html, https://www.ultramobile.com/coverage/; retrieved from the Internet Jan. 25, 2018; 4 pages.

What causes weak cell phone signal and dropped calls; https://www.repeaterstore.com/pages/causes-of-weak-signal; retrieved from the Internet Jan. 25, 2018; 3 pages.

* cited by examiner

METHOD AND SYSTEM FOR DETERMINING SIGNAL STRENGTH FOR A MOBILE DEVICE

TECHNICAL FIELD

The present disclosure relates to wireless network environments. More particularly, the present disclosure relates to generating an indication of signal strength for specific locations in a wireless network environment.

BACKGROUND

Phone signals can be poor at certain locations with few or no signal bars or frequently dropped calls. The same is true for other mobile computing devices. This can be very frustrating, especially for very important calls such as emergencies or client meetings or interview calls etc. Telecommunication centers have towers and strength maps. Bad cell phone reception is generally caused by two categories of reasons: (1) localized poor coverage due to building materials or destructive interference, and (2) geographical distance from or obstacles between your phone and the nearest cell tower. Localized poor coverage is more frequent as cellular signals have a hard time passing through metal and concrete within the walls of the building, or the Faraday cage in the building. Also in cities, cell signals will be reflected by walls or other barriers so that the signal strength might be diminished from interference with other signals. Similar situations may occur in a desert or when traveling near mountains, deep valleys, etc.

Connection issues affect all users of mobile devices across countries irrespective of service provider and location. As mobile devices continue to become more prevalent in society, users of such devices will continue to have connection issues in areas with little to no service. Countless business and personal calls have lost connection with no warning due to users entering these areas. Mobile device users are unaware of areas where signal coverage is weak and where it is strong.

Accordingly, there is a need for a system that provides a user with actionable information regarding areas of weak and strong signal for mobile devices.

The above information is presented as background information only to assist with an understanding of the present disclosure. No determination has been made, and no assertion is made, as to whether any of the above might be applicable as prior art with regard to the present disclosure.

SUMMARY

A system and method are provided for predicting a signal strength for a specific location. The method includes operations for predicting mobile device signal strength by building a database of mobile signal information. The mobile signal information includes signal strength for a plurality of mobile devices located at a plurality of three-dimensional, geospatial coordinates and utilizing a plurality of mobile signal providers/carriers. The method predicts, using the database, a signal strength for a particular mobile device at a particular set of three-dimensional, geospatial coordinates utilizing a particular mobile signal provider/carrier.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present disclosure describes a system and method for determining localized signal strength at each of multiple locations based on signal strength data and corresponding location information received from multiple mobile devices.

One objective of the present invention is to develop a method that collects the crowdsourced signal strength data points (especially the poor signal areas) and combines with carrier network information, as well as social media extraction, to perform analytics and pattern determination. Additionally, a method is provided that can predict bad signals based on the historical data and relationships. The application primarily is targeted at indoor scenarios, although it can be extended to outdoors.

Figure 1:
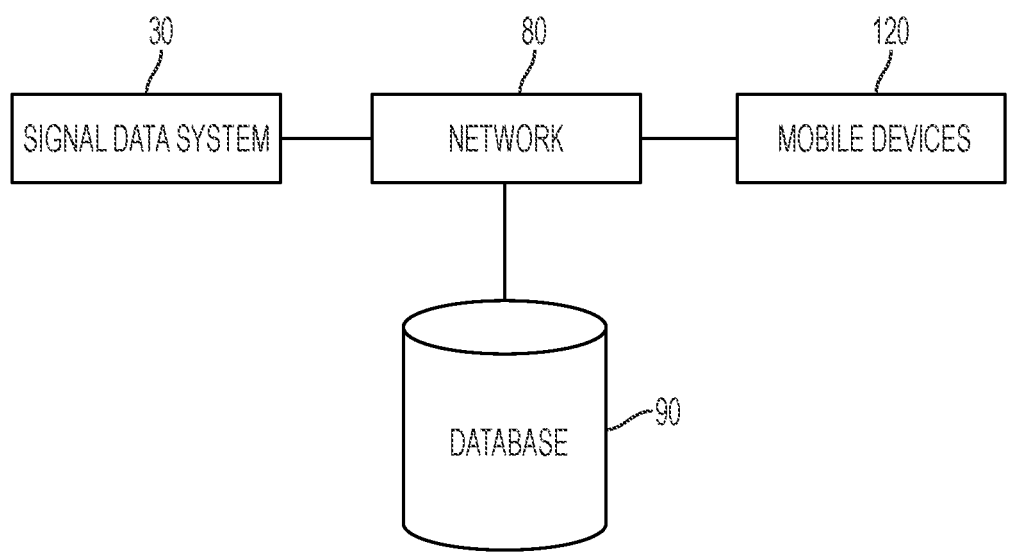
FIG. 1 is a schematic representation of a signal data system environment of a non-limiting embodiment of the present disclosure.

Referring now to FIG. 1, a schematic representation of a signal data system environment of a non-limiting embodiment of the present disclosure is illustrated. A signal data system 30 may be connected to a database 90 and mobile devices 120 via a network 80.

Network 80 may comprise one or more entities, which may be public, private, or community based. Network 80 may permit the exchange of information and services among users/entities that are connected to such network 80. In certain configurations, network 80 may be a local area network, such as an intranet. Further, network 80 may be a closed and/or private network/cloud in certain configurations, and an open network/cloud in other configurations. Network 80 may facilitate wired or wireless communications of information and provisioning of services among users that are connected to network 80.

Network 80 may comprise one or more clouds, which may be public clouds, private clouds, or community clouds. Each cloud may permit the exchange of information and the provisioning of services among devices and/or applications that are connected to such clouds. Network 80 may include a wide area network, such as the Internet; a local area network, such as an intranet; a cellular network, such as a network using CDMA, GSM, 3G, 4G, LTE, or other protocols; a machine-to-machine network, such as a network using the MQTT protocol; another type of network; or some combination of the aforementioned networks. Network 80 may be a closed, private network, an open network, or some combination thereof and may facilitate wired or wireless communications of information among devices and/or applications connected thereto.

Network 80 may include a plurality of devices, which may be physical devices, virtual devices (e.g., applications running on physical devices that function similarly to one or more physical device), or some combination thereof. The devices within network 80 may include, for example, one or more of general purpose computing devices, specialized computing devices, mobile devices, wired devices, wireless devices, passive devices, routers, switches, mainframe devices, monitoring devices, infrastructure devices, other devices configured to provide information to and/or receive information from service providers and users, and software implementations of such.

In addition, network 80 may communicate with a plurality of mobile devices 120, such as cellular phones, tablets, laptops, and other portable devices. Mobile devices may each be associated with a cellular network provider. In some non-limiting embodiments of the present disclosure, all the mobile devices that send information to the signal data system 30 may be serviced on a singular cellular network provider. In other non-limiting embodiments, the mobile devices may be on multiple cellular network providers. Mobile devices 120 may be powered by a mobile operating system. Mobile devices 120 also may determine their own GPS position information and provide such data to the signal data system 30 through direct communication or via the network 80. Mobile devices 120 may communicate with signal data system using a cellular network, such as 3G or LTE, for example, or other communication protocols or methods, such as Wi-Fi or NFC, for example. Further, mobile devices 120 may include one or more applications that provide a user interface, which may display alerts, alarms, and/or notifications disclosed herein, and which may provide one or more options for determining signal strength (e.g., requesting signal strength in an area, receiving an indication of low signal strength, receiving directions to an area of greater signal strength, etc.) identified in alerts, requests, and/or notifications. Signal strength, as referenced herein, may refer to signal of a network provider, a Wi-Fi network, or any other service provider.

The signal data environment may also include a database 90 which may include, for example, additional servers, data storage, and resources. Signal data system 30 may receive additional data from database 90. Signal data system 30 may also store signal data, account information, signal mapping, location information, and any information regarding signal data mapping or logging processes on the database 90. Database 90 may be any conventional database or data infrastructure. For example, database 90 may include scaled out data architectures and/or persistent, immutable stores/logging systems.

Figure 2:
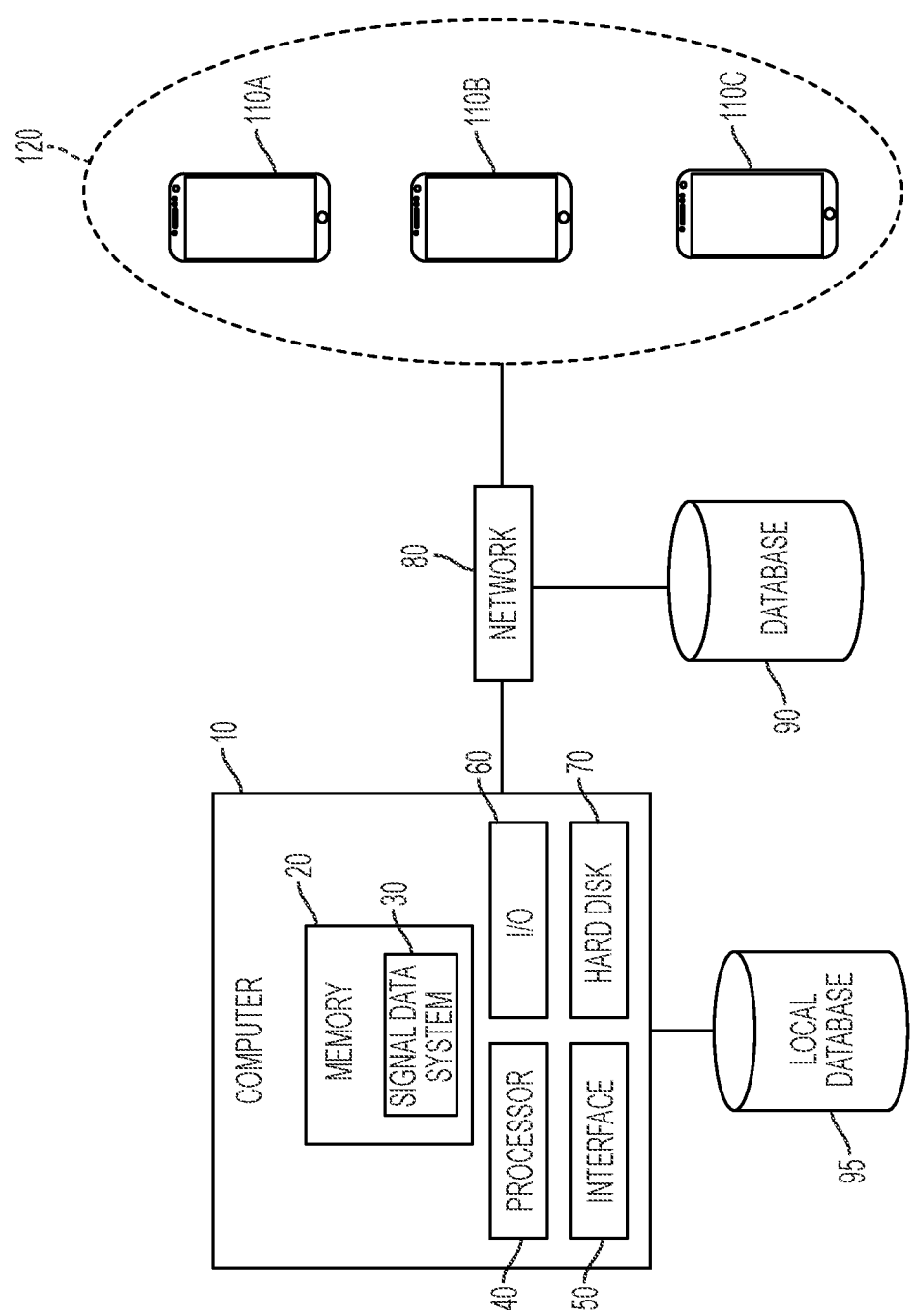
FIG. 2 is a schematic representation of a signal data system configured to determine a signal catalog indicative of reported signal strength information received from a plurality of mobile devices of a non-limiting embodiment of the present disclosure.

Referring to FIG. 2, a schematic representation of the signal data system 30 of a non-limiting embodiment configured to determine a signal catalog indicative of reported signal strength information received from a plurality of mobile devices of a non-limiting embodiment of the present disclosure is displayed. Computer 10 may reside on one or more networks. Computer 10 may comprise a memory 20, a central processing unit, an input and output ("I/O") device 60, a processor 40, an interface 50, and a hard disk 70. Memory 20 may store computer-readable instructions that may instruct computer 10 to perform certain processes. In particular, memory 20 may store a plurality of application programs that are under development. Memory 20 also may store a plurality of scripts that include one or more testing processes for evaluation of the applications. When computer-readable instructions, such as an application program or a script, are executed by the CPU, the computer-readable instructions stored in memory 20 may instruct the CPU to perform a plurality of functions. Examples of such functions are described below with respect to FIGS. 3-5. In some non-limiting embodiments of the present disclosure, the CPU may be a signal data system 30. In some implementations, when computer-readable instructions, such as an application program or a script, are executed by the signal data system 30, the computer-readable instructions stored in memory 20 may instruct the signal data system 30 to perform a plurality of functions.

I/O device 60 may receive one or more of data from network 80, local database 95, data from other devices and sensors connected to computer 10, and input from a user and provide such information to the signal data system 30. I/O device 60 may transmit data to network 80 or local database 85, may transmit data to other devices connected to computer 10, and may transmit information to a user (e.g., display the information, send an e-mail, make a sound). Further, I/O device 60 may implement one or more of wireless and wired communication between computer 10 or signal data system 30 and other devices within or external to network 80. I/O device 60 may receive one or more of data from another server or a network 80. The computer 10 may be a processing system, a server, a plurality of servers, or any combination thereof.

Signal data system 30 may be located on the cloud or on an external network. In some non-limiting embodiments, signal data system 30 may be partially located on a mobile device and partially on the cloud or a network, or any combination thereof. Furthermore, some non-limiting configurations of signal data system 30 may be located exclusively on a user's device, such as, for example a mobile device or tablet. Signal data system 30 may also be accessed by a user on a device such as any type of computing device, such as, for example, a mobile telephone.

Further referring to FIG. 2, mobile devices 120 may include a plurality of mobile devices such as mobile devices 110A, 110B, and 110C. Mobile devices 110A, 110B, and 110C may communicate with signal data system 30 directly or via network 80. In some non-limiting embodiments of the present disclosure, a mobile application may be installed on each of the mobile devices 120. The mobile application may constantly track and store signal strength data and corresponding location information of the mobile device. In some non-limiting embodiments, the mobile application on a mobile device may track, record, and report information to the signal data system 30. Location information may include GPS data, network location data, and/or latitude and longitude data. The signal strength data and corresponding location information may be uploaded to a cloud database, stored locally on the mobile devices 120, transmitted directly to the signal data system 30, or stored in any other database facility. In some non-limiting embodiments, mobile devices 110A, 110B, and 110C may store signal strength data and corresponding location information locally until reaching an area providing network access. In some non-limiting embodiments of the present disclosure, a mobile application may manage all signal strength data and corresponding location information on the mobile device. The mobile application may maintain an offline copy of all information. In some systems and methods of the present disclosure, signal data system 30 may rely on information in a cloud database where multiple mobile devices have uploaded signal strength data and corresponding location information.

Location information may include GPS data and cellular network base station triangulation data. In some non-limiting embodiments of the present disclosure, location of a mobile device may be determined via triangulation of radio signals between multiple cell towers of a network and the mobile device. The mobile device may emit at least the roaming signal to contact the next nearby antenna tower, but the process does not require an active call. Any other type of mobile phone location tracking, whether network-based, handset-based, SIM-based, Wi-Fi based, or hybrid based, is considered by the present disclosure.

Figure 3:
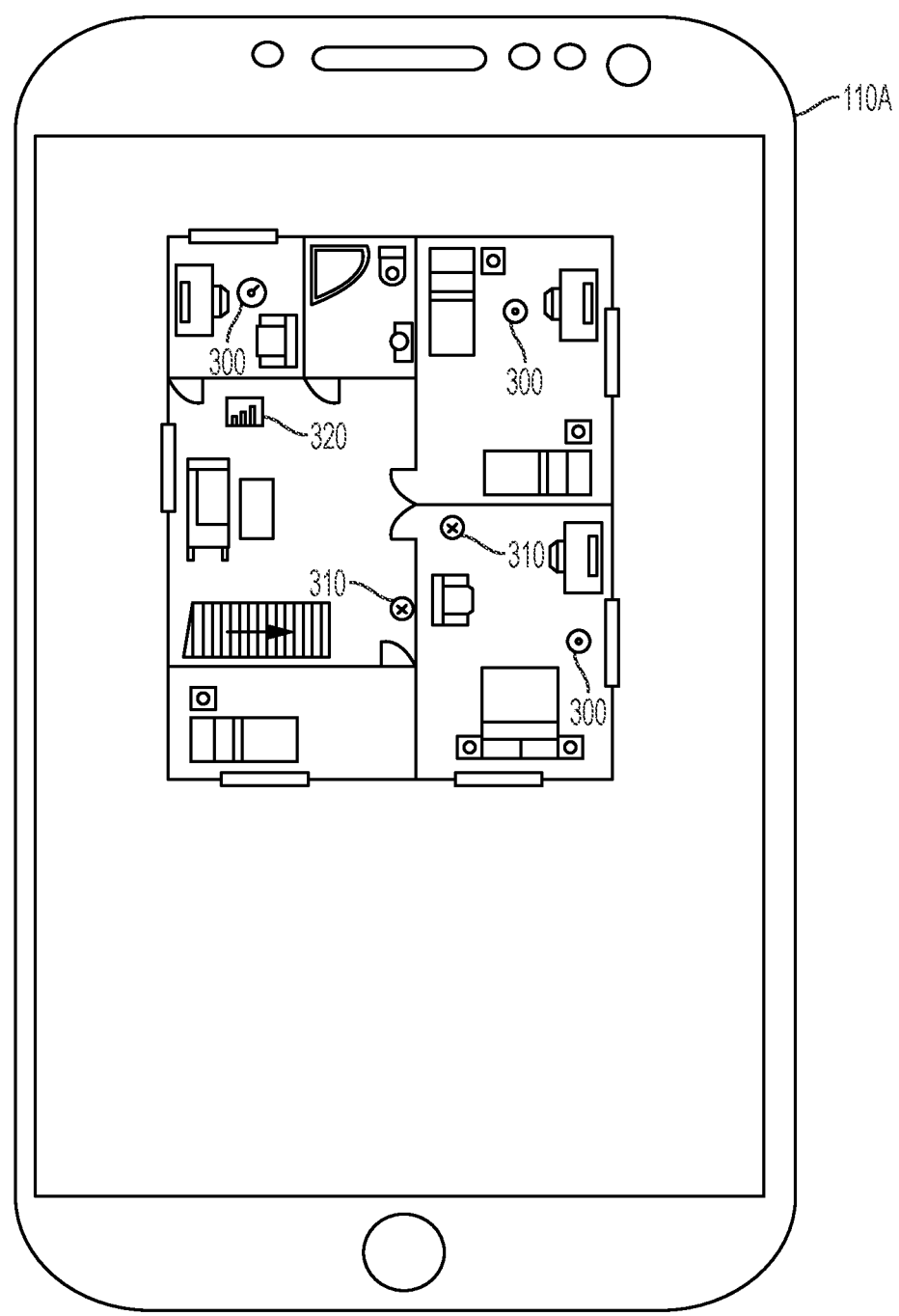
FIG. 3 illustrates a signal map on a mobile device for a simple floor plan of a non-limiting embodiment of the present disclosure.

FIG. 3 illustrates a signal map for a simple floor plan as displayed on a mobile device of a non-limiting embodiment of the present disclosure. Signal data system 30 may receive a plurality of signal strength and location data (e.g., through GPS position information) from multiple mobile devices in the manner described in more detail below. Signal data system 30 may generate a signal catalog indicative of reported signal strength at multiple locations and from multiple sources including service providers, social media data, crowd sourced data, etc. In addition, signal data system 30 may determine an average of reported signal strength at corresponding locations. The determined average signal strength may be overlaid on a map in multiple formats and FIG. 3 illustrates a simplified floorplan example for explanatory purposes. The present invention is intended to encompass a three-dimensional signal map that may be presented in a three-dimensional format to ascertain signal strength, for example, on different floors of a building having multiple floors. In some non-limiting embodiments, markers indicating signal strength may be placed on a reference map such that the user may view areas of both weak and strong signal for a mobile device. Signal data system 30 may generate a signal map by overlaying the signal catalog on any type of map such as, for example, a general reference map. A signal map may be stored online, in the cloud, in a private/local network, in a public network, or in a local database of a mobile device for offline access. If provided for storage on the local database of the mobile device, the signal map may be updated periodically (e.g., at a predetermined time configured by signal data system 30) when the mobile device is in an area with service, signal, and/or Wi-Fi.

As shown in FIG. 3, indicators 300 and 310 may represent a single signal strength datum or an average of information reported from multiple mobile devices. Indicator 300 may represent an area determined by signal data system 30 to have strong signal based on reported information. A user of a mobile device 110A, for example, may travel to indicator 300 with confidence that there will be signal available for the mobile device 110A. Equally as useful, indicator 310 may represent an area determined by signal data system 30 to have low signal strength or no signal. A user of a mobile device 110A may rely on indicator 310 to avoid dropped calls or connection issues. For example, indicator 320 shows the "bars" of service available at a specific location. Other indicators of signal strength may be employed. Furthermore, a user may receive an indication on the mobile device 110A upon approaching an area of low service such as indicator 310. The indication may be configured to warn the user when the user is located within a predetermined distance of indicator 310 or when the user is determined to reach the area of indicator 310 within a predetermined amount of time. In some non-limiting embodiments of the present disclosure, signal data system 30 may provide any information to the mobile device at run time on the possibility of signal loss.

Figure 4:
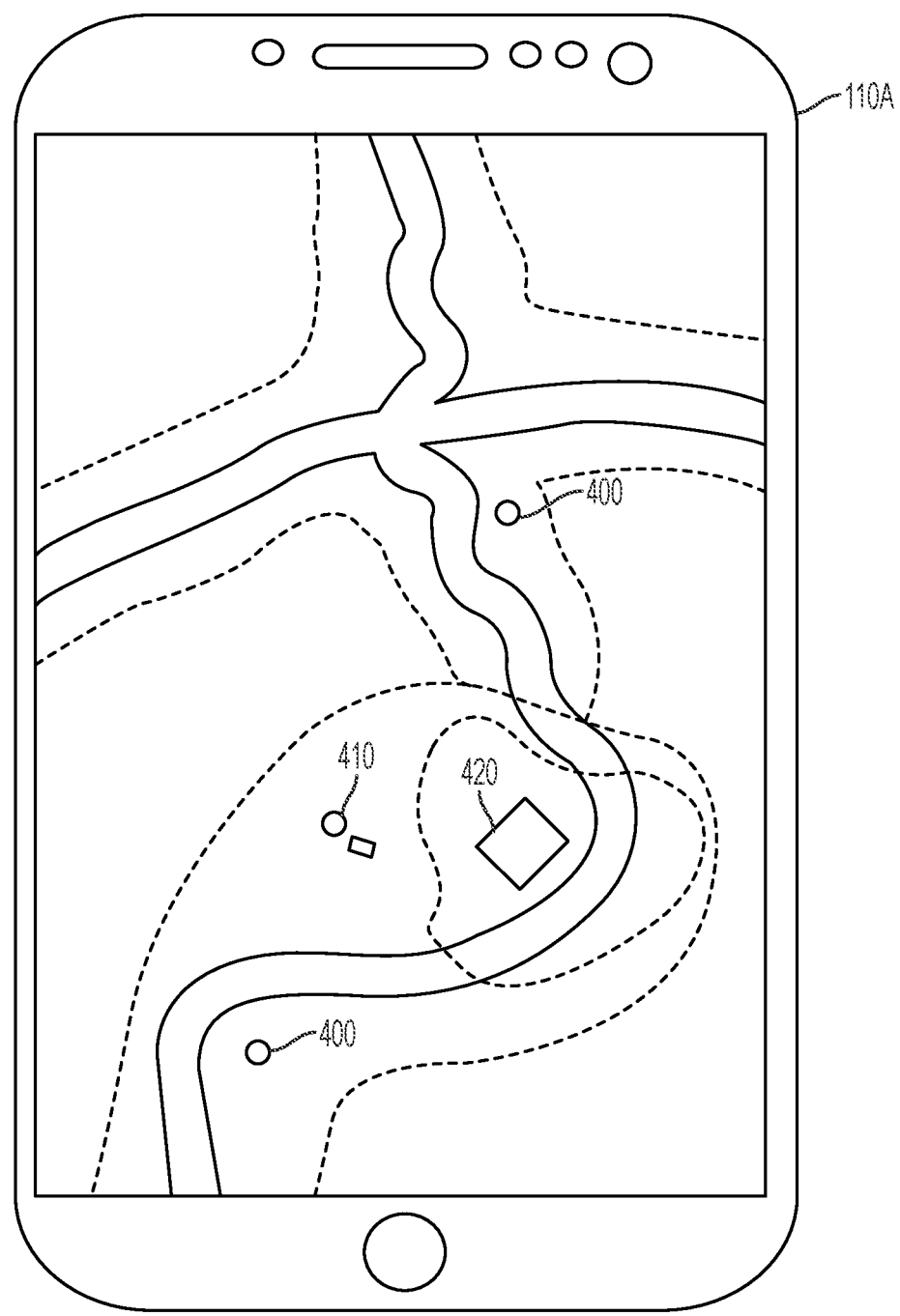
FIG. 4 illustrates a signal map on a mobile device of a non-limiting embodiment of the present disclosure.

In some non-limiting embodiments of the present disclosure, as depicted in FIG. 4, markers indicating signal strength may be placed on a reference map such that a user may view areas of both weak and strong signal for a mobile device. Indicator 400 may represent an area where average reported signal strength is strong, indicator 410 may represent an area where average reported signal strength is moderate, and indicator 420 may represent an area where the average reported signal strength is weak. A user of a mobile device may use this information in determining to take any action on a mobile device. Furthermore, as depicted in FIG. 4, boundaries around indicators 400, 410, and 420 may illustrate the extent of the respective signal strength. For example, the boundary surrounding indicator 420 may illustrate the area in which the average reported signal strength is weak or nonexistent. The boundaries shown in FIG. 4 may fluctuate as signal data system 30 receives additional reported signal strength from mobile devices of the community of users. As a result, a user of the mobile device may receive updated information and mapping.

One focus of the present invention is indoor service signal quality. The indoor service signal can be even trickier than outdoors, with little/no bars inside the premises. A user might experience dropped calls, poor voice quality, very slow internet, stuck text message and emails, and hanging social media updates etc. The indoor signal strength is not only impacted by the general factors such as tower distance, obstacles, weather, but also indoor factors such as building materials (metal, concrete, thick walls, or energy-efficient installations etc). People may have to move closer to a window, higher level, away from clutter etc. to get better signal.

There are also methods/equipment such as WiFi calling, Femtocells, or cell phone signal boosters to improve indoor signal strength. This invention will take into account this additional data to help improve signal strength determination.

Figure 5:
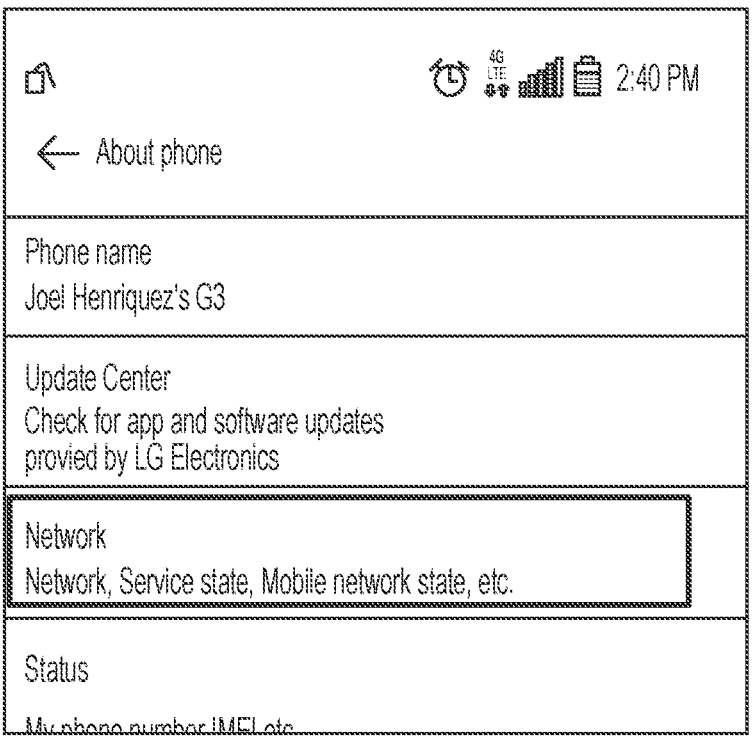
FIG. 5 illustrate an example of signal strength for 4G LTE Standard reading for an Android phone.
Figure 5:
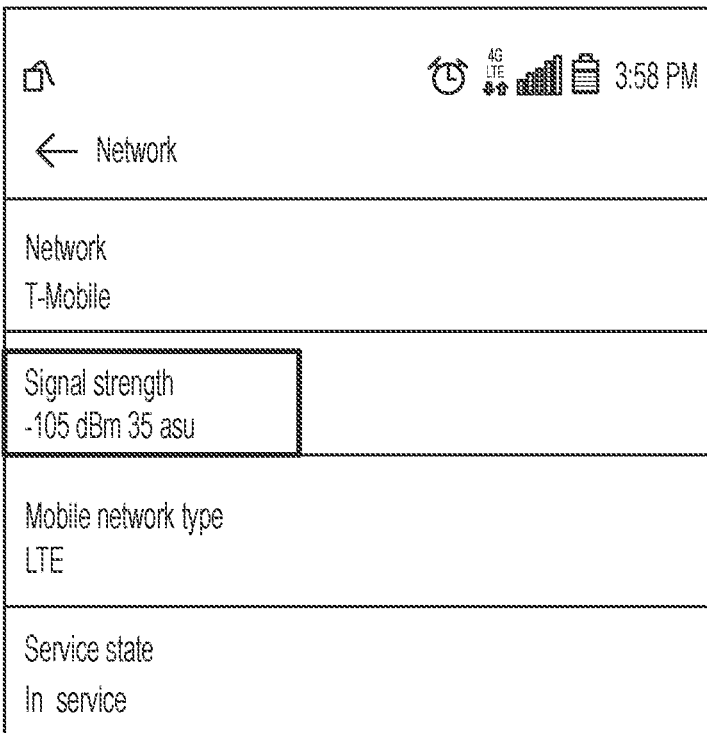

The present invention provides a unique system and method for collecting data. Using conventional techniques, the signal strength is recorded in smartphones, and they are measured in decibels (dB) as radio waves with a range of −50 to −120 for the cellular devices. It is unreliable to rely on the number of bars for strength because there is no industry standard for signal strength indication. However, one can find dB readings on one's phone: −50 dB is full strength and −120 dB is dead zone. FIG. 5 illustrate an example of signal strength for 4G LTE Standard reading for an Android phone.

Conventional products exist to help boost the signal strength which can boost the signal up multiple (i.e., 32 times). Other products can also be used at home or small businesses to allow service provider to extend service coverage indoors. However, indoor signal strength distribution or the booster/femtocell locations in a new building are difficult to determine. Likewise, it is difficult to find a good signal spot in the short term after dropped an important client call to call back. Thus, there is a need to provide information on the indoor signal strength distribution.

When the user experiences a bad signal or drop off, he/she contributes a useful data point that will be useful for analytics, so that other people can learn about the signal strength in that particular location. The present invention further seeks to use crowdsource information and then build analytics and forecast based on this data. In other words, the present invention seeks to build a statistical and forecast map that shows signal strength, based on signal quality history data and also crowd sourced data, i.e., useful data points from users in particular locations. Useful insights can be drawn from this data and provides information or recommendation for other users at various scenarios.

This disclosure is to develop a method that collects the crowdsourced signal strength data points (especially the poor signal areas) and combines with carrier network information, as well as social media extraction, to perform analytics and pattern determination. Additionally, a method is provided that can predict bad signals based on the historical data and relationships. The application primarily is targeted at indoor scenarios, although it can be extended to outdoors.

The method can: (1) collect bad signal location and strength with various information; (2) collect related signal information from social media; (3) combine all the collect information and carrier network coverage to build a database and perform analytics to find patterns and relationships, thus useful insights; (4) make bad signal predictions and make recommendations; (5) use feedback from the end users to further augment the algorithm; (6) be useful for multiple scenarios including bad signal notification inside a house/building to build history record in a fine spatial resolution; (7) recommend on when and where to have an important short duration (e.g. 15 minutes) call; (8) provide objective information and guidance for customers to choose carriers and phones, based on the performance evaluations; and (9) respond to social media points where new free wireless LAN is available to update meta information.

Figure 6:
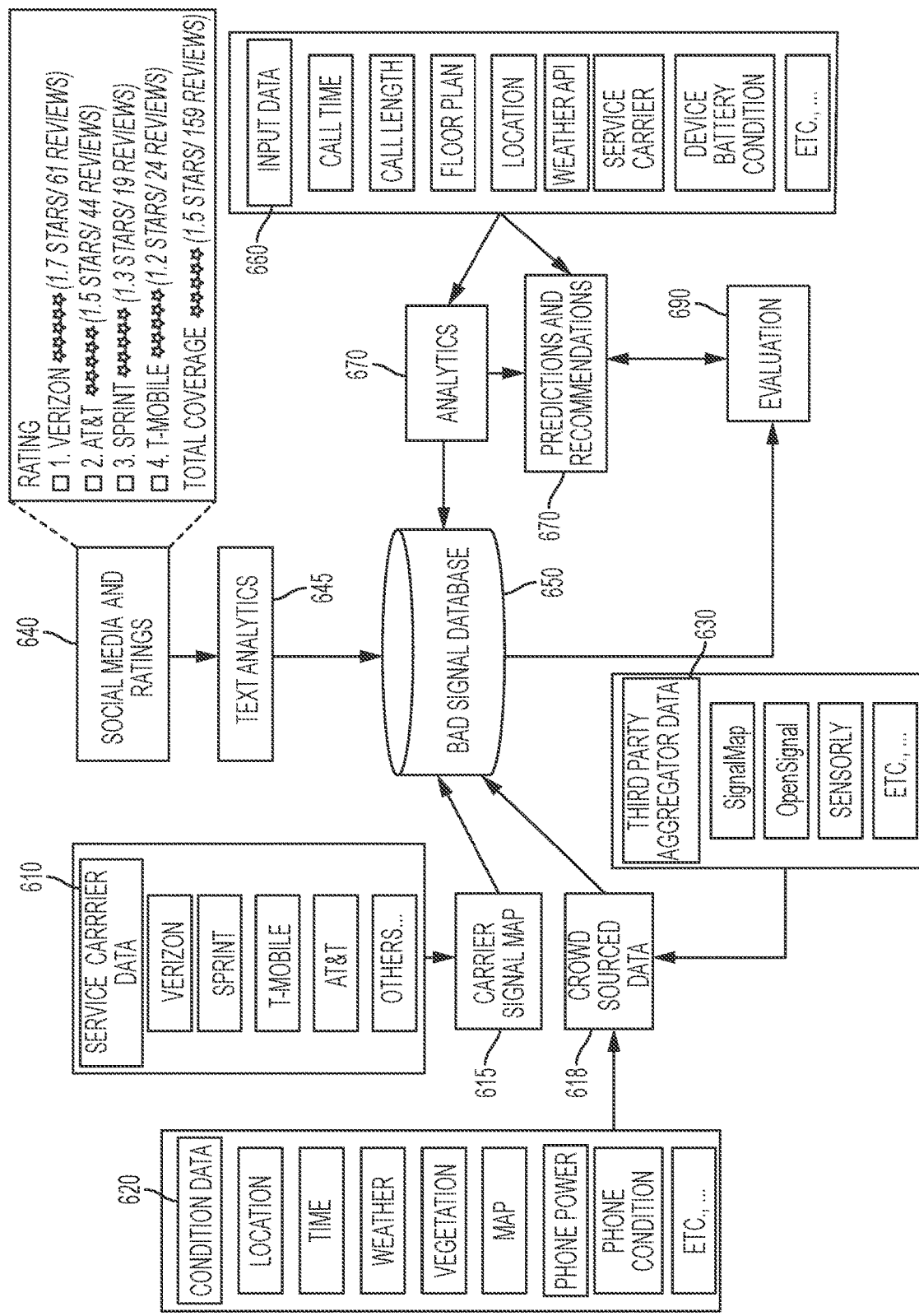
FIG. 6 illustrates an information flowchart showing different components and features of the data collection and processing system according to the present invention.

FIG. 6 illustrates an information flowchart showing different components and features of the data collection and processing system according to the present invention. With reference to FIG. 6, various database records are collected and analyzed to evaluate signal strength in a particular and preferably a pin-pointed location. As shown in FIG. 6, data 610 collected from service carriers, who are the service providers for phones known to those skilled in the art may be identified when collecting the data because these services already have certain amount of data mapped to identify signal strength. Indeed, each carrier will provide its carrier signal coverage map 615 based on the respective carrier tower distribution etc. and this data will serve as very important course resolution input information. Moreover, it is useful to collect the impacting factors 620 when the data point is collected, such as: when and where the signal data is collected, what is the weather situation, vegetation at the location. what is the phone battery situation, etc. These data points will be very important for analytics. For example, weak signals under severe weather are susceptible to rapid change. The time of data collection may be related to tower traffic etc.

Figure 7A:
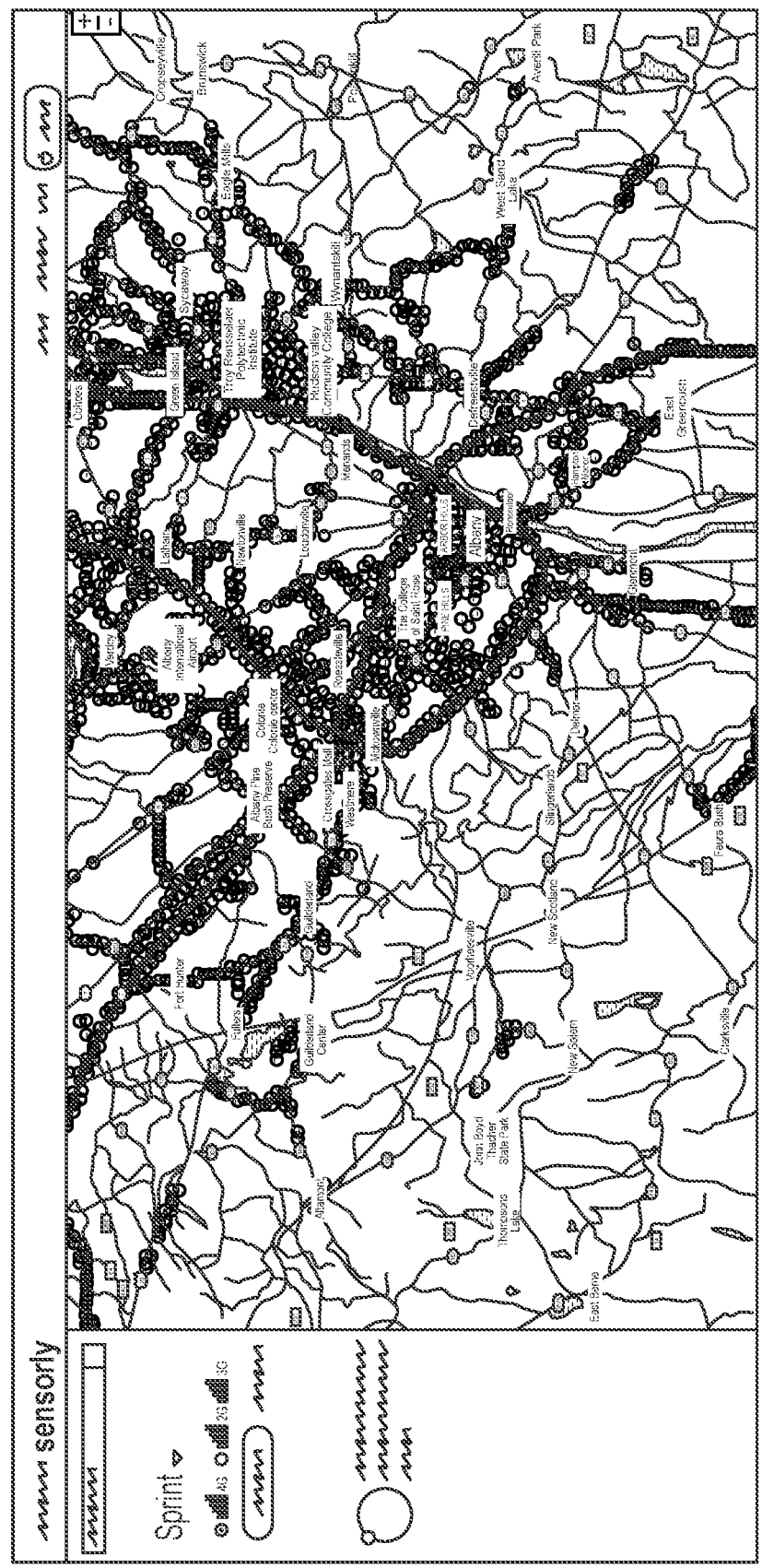
FIGS. 7A-7B illustrates various signal data strength available for the city of Albany, N.Y. for two different carriers with the highlighted areas showing signal strength which focuses on areas of business and travel; i.e., roads, highways, and airports.
Figure 7B:
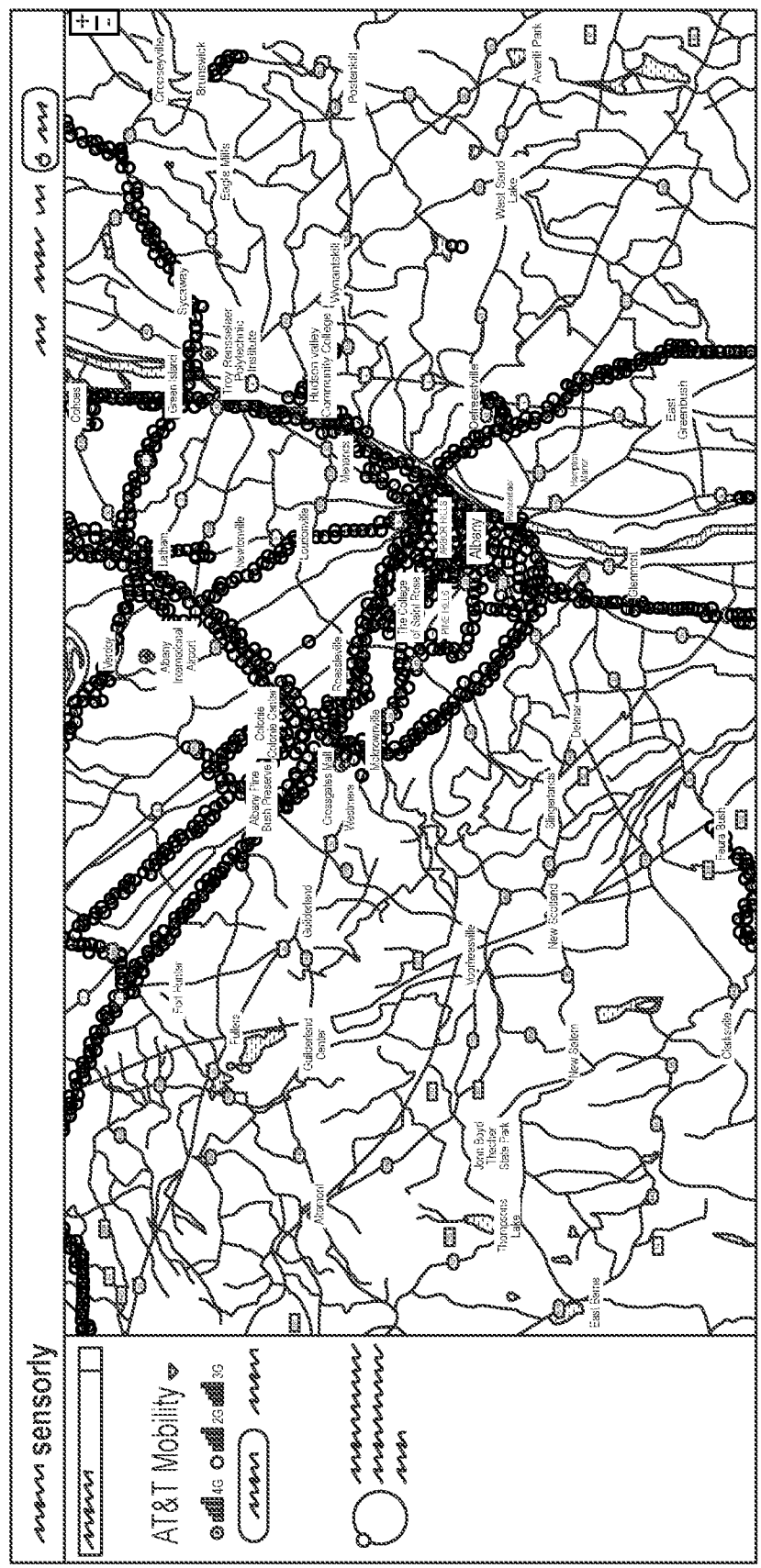

Third party signal data aggregator data 630, which is the existing 3rd party data sources can be used as great input information to enrich the database envisioned by this invention. FIGS. 7A-7B illustrates various signal data strength available for the city of Albany, N.Y. for two different carriers with the highlighted areas showing signal strength which focuses on areas of business and travel; i.e., roads, highways, and airports. These examples of data source are examples of crowd-sourced data point. The forgoing crowd-sourced information can be compiled at crowd-sourced data collection point 618 and used to produce our matched and quality-controlled data points, which will be recorded in the database of the present invention. Additionally, social media and ratings as well as data 640 from social media and ratings can be used as valuable evaluation of the service quality and signal strength. For example, many social media sites provide customer rating and evaluations of signal strength for special carriers at specific but generalized locations. This data too may be useful when generating the information useful for the present invention. Text analytics 645; i.e., methods of text analytics, may also be used to vectorize the social media sentiment over particular service areas and service providers.

The above-described data points; e.g., service carrier data 610, condition data 620, $3^{rd}$ party aggregation data 630, social media data 640, etc., may be collected into a bad signal database 650 whereby all the above valuable inputs will be recorded and used to discover patterns and correlations to provide insights and forecasts and recommendation.

With all the data records in the bad signal database 650, various analytics can be conducted at 670 to understand the temporal and spatial patterns of the signal strength so as to, for example: (1) evaluate the impact factors of bad signals such as weather (based on correlation and also time series analysis etc.), (2) to evaluate the service provider performance for a particular location, (3) to infer the possible booster, access point or Femtocell coverage areas, and (4) to discover the dead zones.

Input data 660 such as call time, call length, floor plan information, GPS location, weather, service carrier, phone battery status, etc. which may be collected from an individual phone or user device, are relevant to the strength signal or related to the application and this input data 660 is also used by the analytics 670. This data may be particularly relevant to an important client call for a duration of, for example, 15 minutes. This information will be particularly relevant to determine the user requirement of a stable phone signal strength for the specific situation at hand, e.g., a 15 minutes phone call from a specific location. As discussed herein, floor plan data may also be particularly relevant to a specific signal strength inquiry.

Prediction and recommendation 680 are based on the analytics 670 insights and also application input data 660. The invention can provide signal strength forecast and even recommendation. Such as 'the phone signal will be unstable due to communication traffic between 1~2 pm' or 'Verizon user, please walk east 50 meters to avoid the dead zone take advantage of the installed signal booster.' Predictions and forecasts of signal strength will be performed based on data collected based on past events and conditions at a particular location in conjunction with data collected on current events and conditions at that same location.

The invention may provide an evaluation 690 by comparing the predicted signal strength range with the actual observed one. As a result, the invention can further evaluate the algorithm and further improve the model and parameters to stay on this self-improving route.

Based on the foregoing disclosure, the present invention provides a system and method for predicting mobile device signal strength by building a database of mobile signal information, including signal strength for a plurality of mobile devices, the plurality of mobile devices being located at a plurality of three-dimensional, geospatial coordinates and utilizing a plurality of mobile signal providers/carriers. The system and method further predict, using the database, a signal strength for a particular mobile device at a particular set of the three-dimensional, geospatial coordinates utilizing a particular mobile signal provider/carrier.

Additionally, the database preferably is built using: (i) signal maps from the providers/carriers, (ii) crowdsourced mobile signal data, including geospatial (three-dimensional) coordinates and signal strength, from mobile devices utilizing the providers/carriers, and (iii) social media posts and ratings pertaining to the signal strength of particular providers/carriers and of particular locations.

Additionally, the database preferably is built from crowdsourced mobile signal data that includes predicting the signal strength based on a combination of: time, call length, location floor plan, weather, vegetation, and phone power level.

Additionally, the database is built by correlating the geospatial (three-dimensional) coordinates of the database with floor plan information of a particular building, wherein the predicting of the signal strength is further based on a predicted floor of the particular mobile device within the particular building.

Important novelties of the present invention include, but are not limited to: (1) a method to collect and summarize the crowd-sourced data of wireless phone signal strength and the related coordinates; (2) a method to combine collected signal and patterns to a correlated floor plan or three-dimensional layout; (3) a method to predict and notify bad signals based on a collective group signal strength/quality historical data and relationships: and (4) a method to guide and recommend a user with objective information to find, through prediction and forecasting, a better signal location.

Figure 8:
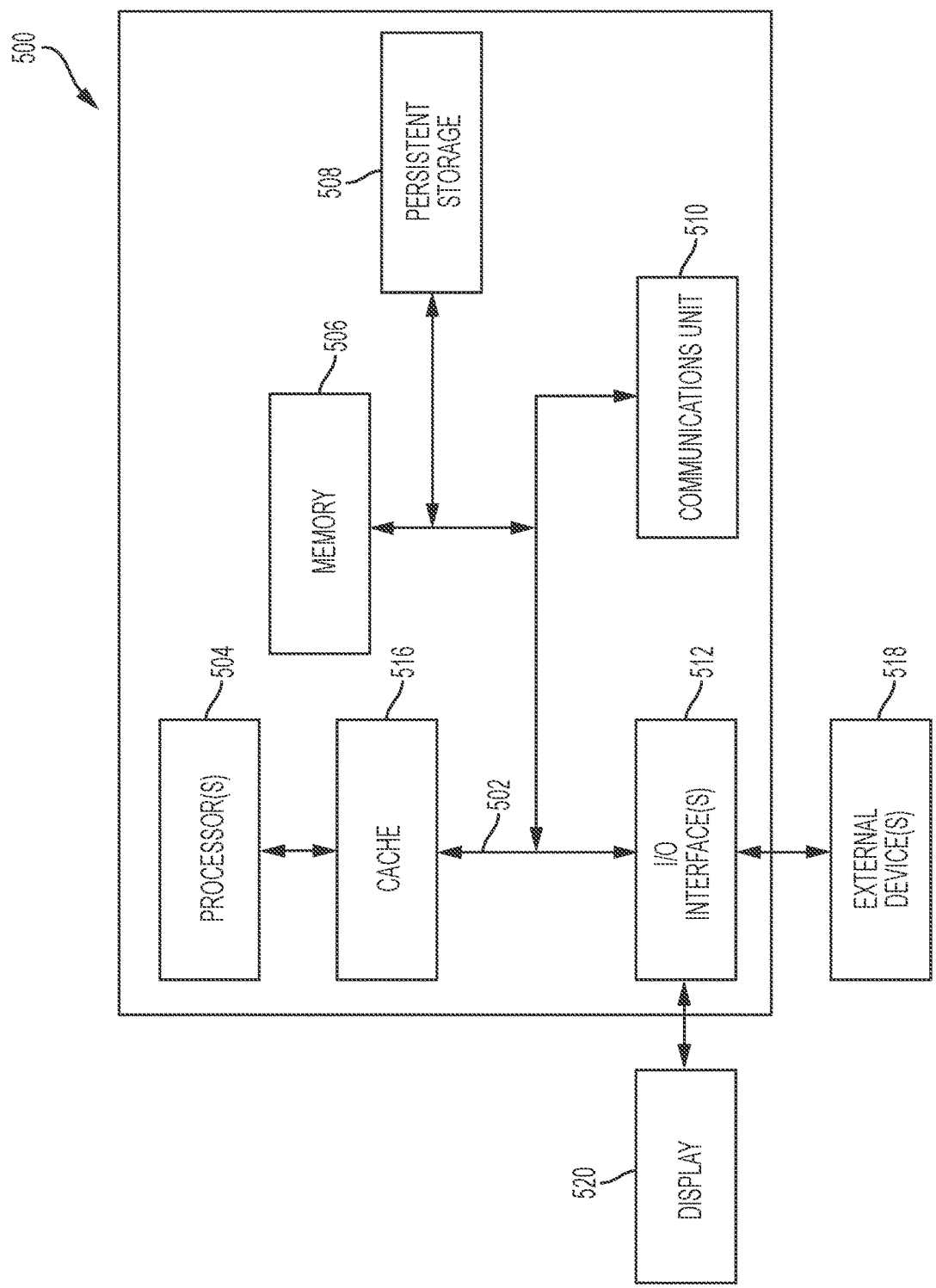
FIG. 8 depicts a block diagram of components of a computing device, in accordance with an illustrative embodiment of the present invention.

FIG. 8 depicts a block diagram of internal and external components of a computing device, generally designated 500, which is representative of components of FIG. 1, in accordance with an embodiment of the present invention. It should be appreciated that FIG. 8 provides only an illustration of one implementation and does not imply any limitations with regard to the environment in which different embodiments may be implemented. Many modifications to the depicted environment may be made.

Computing device 500 includes communications fabric 502, which provides communications between computer processor(s) 504, memory 506, cache 516, persistent storage 508, communications unit 510, and input/output (I/O) interface(s) 512.

Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of a network. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
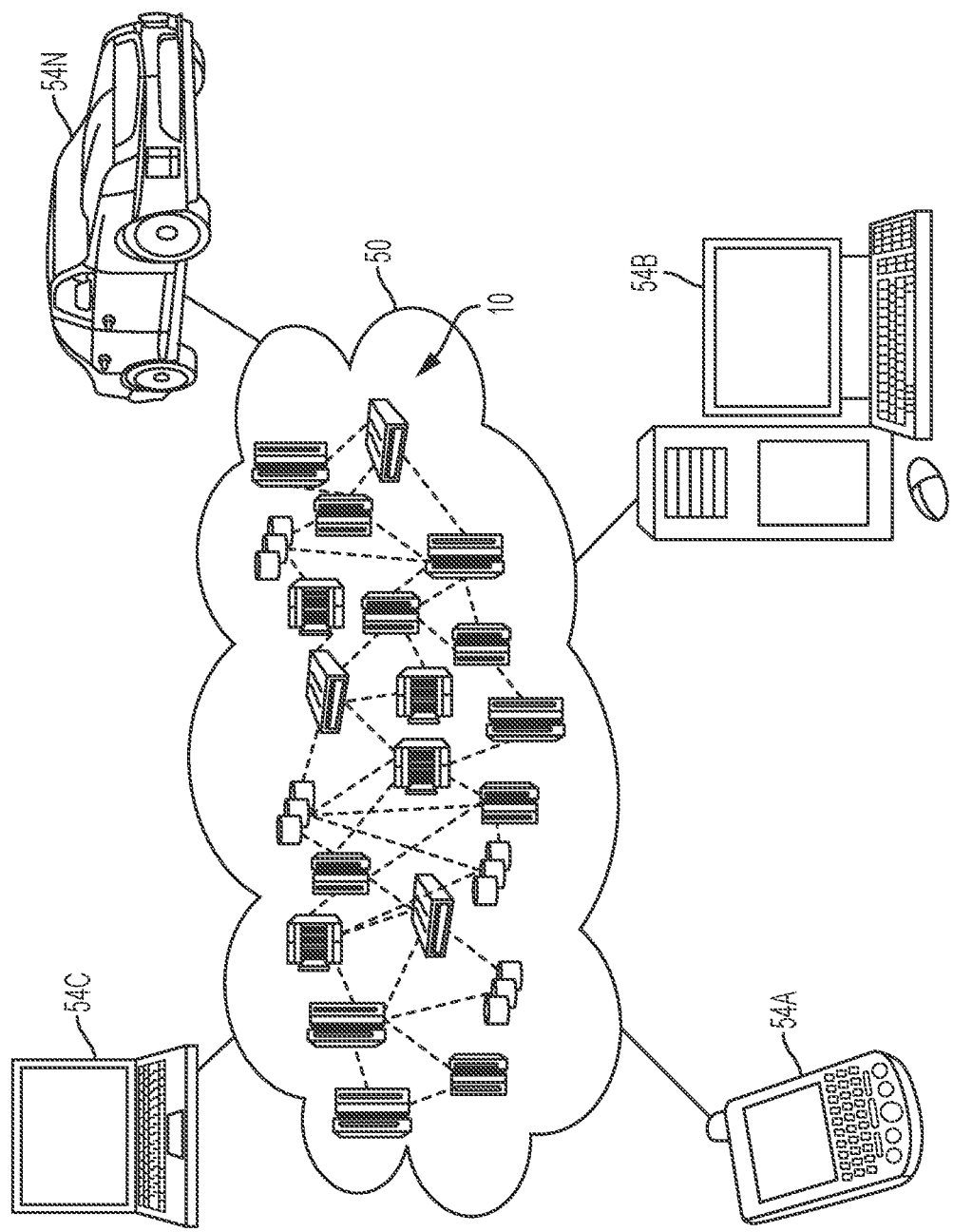
FIG. 9 depicts a cloud computing environment, according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 10:
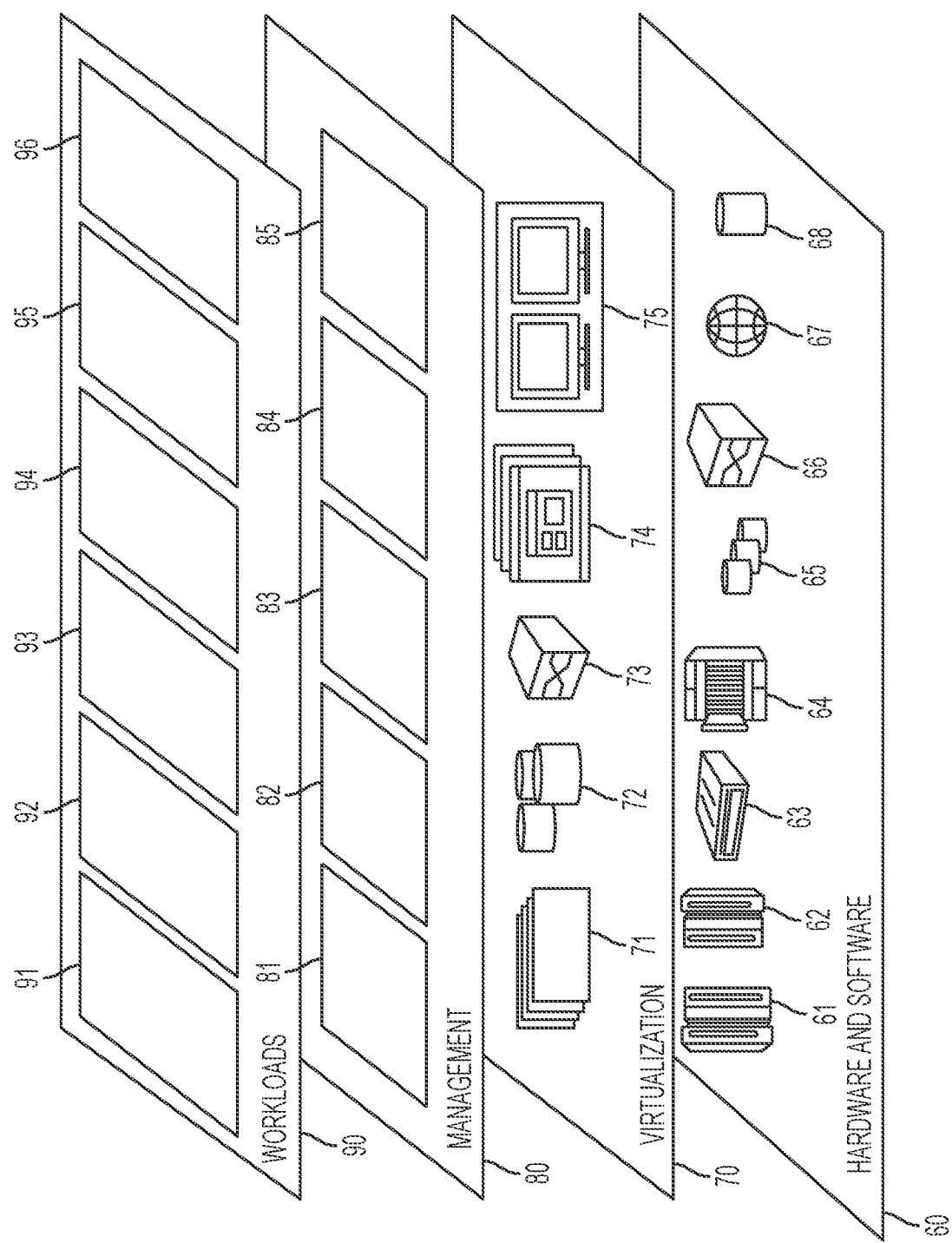
FIG. 10 depicts abstraction model layers, according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and wishlist/cart data processing 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
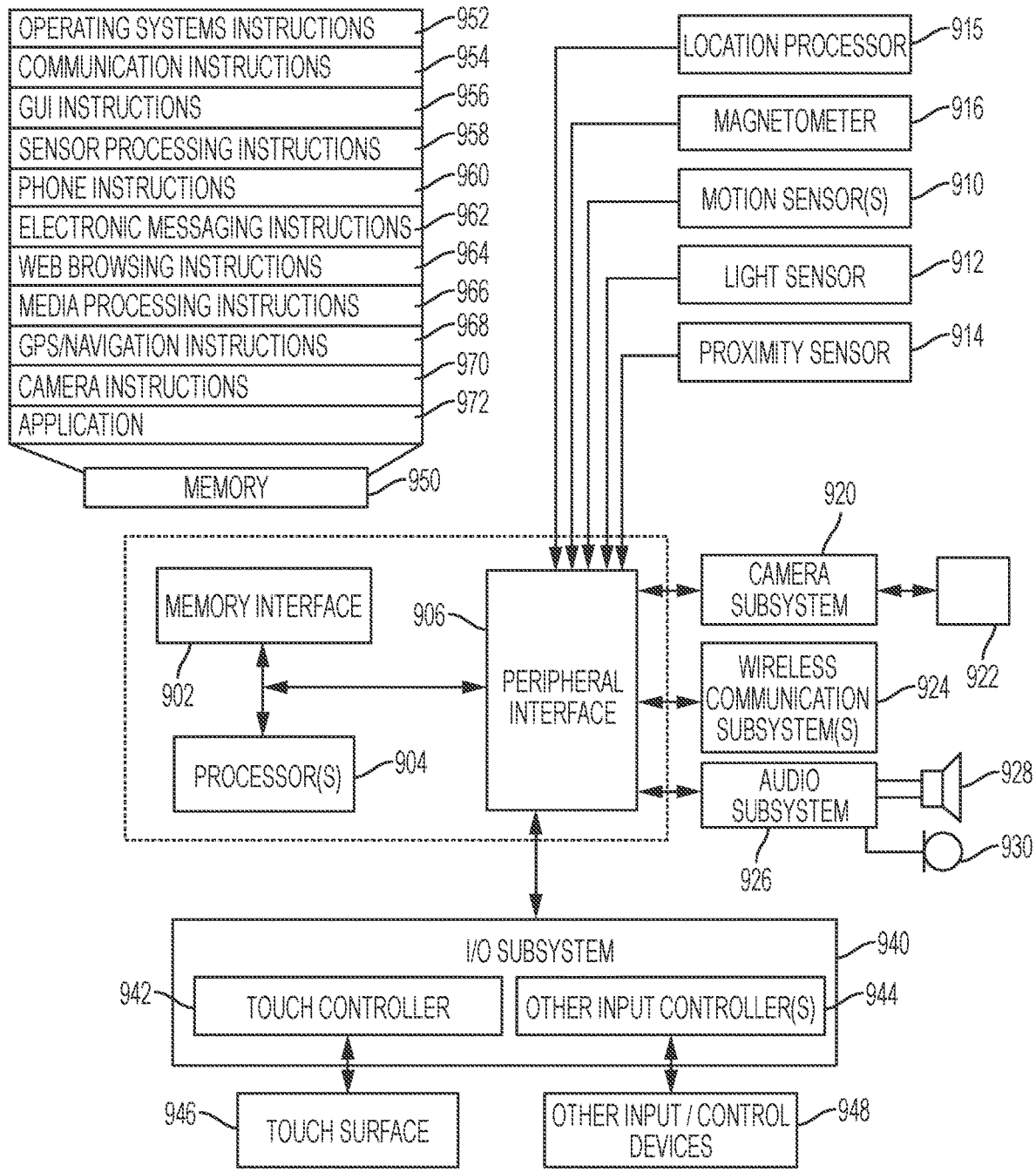
FIG. 11 illustrates a mobile device architecture that may be utilized to implement the various features and processes described herein.

FIG. 11 illustrates a mobile device architecture that may be utilized to implement the various features and processes described herein. Architecture 900 can be implemented in any number of portable devices including but not limited to smart phones, electronic tablets, and gaming devices. Architecture 900 as illustrated in FIG. 11 includes memory interface 902, processors 904, and peripheral interface 906. Memory interface 902, processors 904 and peripherals interface 906 can be separate components or can be integrated as a part of one or more integrated circuits. The various components can be coupled by one or more communication buses or signal lines.

Processors 904 as illustrated in FIG. 11 are meant to be inclusive of data processors, image processors, central processing unit, or any variety of multi-core processing devices. Any variety of sensors, external devices, and external subsystems can be coupled to peripherals interface 906 to facilitate any number of functionalities within the architecture 900 of the exemplar mobile device. For example, motion sensor 910, light sensor 912, and proximity sensor 914 can be coupled to peripherals interface 906 to facilitate orientation, lighting, and proximity functions of the mobile device. For example, light sensor 912 could be utilized to facilitate adjusting the brightness of touch surface 946. Motion sensor 910, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 906, such as a temperature sensor, a biometric sensor, or other sensing device to facilitate corresponding functionalities. Location processor 915 (e.g., a global positioning transceiver) can be coupled to peripherals interface 906 to allow for generation of geo-location data thereby facilitating geo-positioning. An electronic magnetometer 916 such as an integrated circuit chip could in turn be connected to peripherals interface 906 to provide data related to the direction of true magnetic North whereby the mobile device could enjoy compass or directional functionality. Camera subsystem 920 and an optical sensor 922 such as a charged coupled device (CCD) or a complementary metal-oxide semiconductor (CMOS) optical sensor can facilitate camera functions such as recording photographs and video clips.

Communication functionality can be facilitated through one or more communication subsystems 924, which may include one or more wireless communication subsystems. Wireless communication subsystems 924 can include 802.5 or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 924 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.5 communication networks, code division multiple access (CDMA) networks, or Bluetooth networks. Communication subsystem 924 may include hosting protocols such that the device may be configured as a base station for other wireless devices. Communication subsystems can also allow the device to synchronize with a host device using one or more protocols such as TCP/IP, HTTP, or UDP.

Audio subsystem 926 can be coupled to a speaker 928 and one or more microphones 930 to facilitate voice-enabled functions. These functions might include voice recognition, voice replication, or digital recording. Audio subsystem 926 in conjunction may also encompass traditional telephony functions.

I/O subsystem 940 may include touch controller 942 and/or other input controller(s) 944. Touch controller 942 can be coupled to a touch surface 946. Touch surface 946 and touch controller 942 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 946 may likewise be utilized. In one implementation, touch surface 946 can display virtual or soft buttons and a virtual keyboard, which can be used as an input/output device by the user.

Other input controllers 944 can be coupled to other input/control devices 948 such as one or more buttons, rocker switches, thumb-wheels, infrared ports, USB ports, and/or a pointer device such as a stylus. The one or more buttons (not shown) can include an up/down button for volume control of speaker 928 and/or microphone 930. In some implementations, device 900 can include the functionality of an audio and/or video playback or recording device and may include a pin connector for tethering to other devices.

Memory interface 902 can be coupled to memory 950. Memory 950 can include high-speed random access memory or non-volatile memory such as magnetic disk storage devices, optical storage devices, or flash memory. Memory 950 can store operating system 952, such as Darwin, RTXC, LINUX, UNIX, OS X, ANDROID, WINDOWS, or an embedded operating system such as VXWorks. Operating system 952 may include instructions for handling basic system services and for performing hardware dependent tasks. In some implementations, operating system 952 can include a kernel.

Memory 950 may also store communication instructions 954 to facilitate communicating with other mobile computing devices or servers. Communication instructions 954 can also be used to select an operational mode or communication medium for use by the device based on a geographic location, which could be obtained by the GPS/Navigation instructions 968. Memory 950 may include graphical user interface instructions 956 to facilitate graphic user interface processing such as the generation of an interface; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes, camera instructions 970 to facilitate camera-related processes and functions; and instructions 972 for any other application that may be operating on or in conjunction with the mobile computing device. Memory 950 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 950 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer may employ to access functions supporting the API. In some implementations, an API call can report to an application the capabilities of a device running the application, such as input capability, output capability, processing capability, power capability, and communications capability.

Users may use any number of different electronic user devices, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network. User devices may also be configured to access data from other storage media, such as memory cards or disk drives as may be appropriate in the case of downloaded services. User device may include standard hardware computing components such as network and media interfaces, non-transitory computer-readable storage (memory), and processors for executing instructions that may be stored in memory.

The figures included with this disclosure are for the purpose of illustrating the invention. The figures show aspects of one or more embodiments of the invention and are examples, the figures are not meant to limit the scope of the invention. So it should be understood that the present invention is not limited to the precise arrangements and instrumentalities shown in the figures.

Communication networks or links allow for communication between the user device, cloud social media system, and third party developers via various communication paths or channels. Such paths or channels may include any type of data communication link known in the art, including TCP/IP connections and Internet connections via cellular, Wi-Fi, Bluetooth, UMTS, etc. In that regard, communications network may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network allows for communication between any of the various components of network environment.

The cellular signal strength system module may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for predicting mobile device signal strength, the method comprising:
   building, by a processor of a computer system, a database of mobile signal information, the mobile signal information including signal strength for a plurality of mobile devices, the plurality of mobile devices being located at a plurality of three-dimensional, geospatial coordinates, and utilizing a plurality of mobile signal providers/carriers, the mobile signal information further including a past condition associated with the signal strength, wherein the past condition is at least one of time of day, weather, vegetation, and power level;

predicting, by the processor, using the database of mobile signal information, a signal strength for a particular mobile device at a particular set of said three-dimensional, geospatial coordinates of the plurality of three-dimensional, geospatial coordinates, for at least one of a current time and a future time, utilizing a particular mobile signal provider/carrier, wherein said predicting includes comparing the past condition with at least one of a current condition and an expected future condition;

notifying a user of said predicted signal strength for said particular mobile device at said particular set of three-dimensional, geospatial coordinates for at least one of said current time and said future time;

observing, by the processor, an actual signal strength at the respective said current time or said future time; and comparing, by the processor, said observed actual signal strength with said predicted signal strength and using said comparing to improve future predicting using the database.

2. The method as recited in claim 1, wherein the database is built using: (i) signal maps from the providers/carriers, (ii) crowdsourced mobile signal data, including geospatial (three-dimensional) coordinates and signal strength, from mobile devices utilizing the providers/carriers, and (iii) social media posts and ratings pertaining to the signal strength of particular providers/carriers and of particular locations.

3. The method as recited in claim 1, further comprising: recommending a user action designed to result in an improved predicted signal strength compared to said predicted signal strength.

4. The method as recited in claim 1, further comprising correlating the geospatial (three-dimensional) coordinates of the database with floor plan information of a particular building, wherein the predicting of the signal strength is further based on a predicted location of the particular mobile device with respect to said floor plan information within the particular building.

5. The method as recited in claim 1, wherein the database is built using location information including whether a signal boost system exists proximate and area associated with said particular set of said three-dimensional, geospatial coordinates.

6. The method as recited in claim 1, wherein the predicting, using the database, said signal strength for said particular mobile device at said particular set of said three-dimensional, geospatial coordinates includes predicting a boundary around said particular set of said three-dimensional, geospatial coordinates, wherein said boundary defines an area having a comparable signal strength to said signal strength.

7. The method as recited in claim 1, further comprising: directing the user to a new set of three-dimensional, geospatial coordinates having a better predicted signal strength for at least one of said current time and said future time.

8. The method as recited in claim 1, further comprising: displaying said signal strength for said particular mobile device at a particular set of said three-dimensional, geospatial coordinates as an overlay on a floorplan, said overlay and floorplan being displayed on a display of said particular mobile device.

9. A computer program product comprising:
a computer-readable storage device; and
a computer-readable program code stored in the computer-readable storage device, the computer readable program code containing instructions executable by a processor of a computer system to implement a method for predicting mobile device signal strength, the method comprising:

building a database of mobile signal information, the mobile signal information including signal strength for a plurality of mobile devices, the plurality of mobile devices being located at a plurality of three-dimensional, geospatial coordinates, and utilizing a plurality of mobile signal providers/carriers, the mobile signal information further including a past condition associated with the signal strength, wherein the past condition is at least one of time of day, weather, vegetation, and power level;

predicting, using the database of mobile signal information, a signal strength for a particular mobile device at a particular set of said three-dimensional, geospatial coordinates of the plurality of three-dimensional, geospatial coordinates, for at least one of a current time and a future time, utilizing a particular mobile signal provider/carrier, wherein said predicting includes comparing the past condition with at least one of a current condition and an expected future condition;

notifying a user of said predicted signal strength for said particular mobile device at said particular set of three-dimensional, geospatial coordinates for at least one of said current time and said future time;

observing an actual signal strength at the respective said current time or said future time; and comparing said observed actual signal strength with said predicted signal strength and using said comparing to improve future predicting using the database.

10. The computer program product as recited in claim 9, wherein the database is built using: (i) signal maps from the providers/carriers, (ii) crowdsourced mobile signal data, including geospatial (three-dimensional) coordinates and signal strength, from mobile devices utilizing the providers/carriers, and (iii) social media posts and ratings pertaining to the signal strength of particular providers/carriers and of particular locations.

11. The computer program product as recited in claim 9, further comprising:
recommending a user action designed to result in an improved predicted signal strength compared to said predicted signal strength.

12. The computer program product as recited in claim 9, further comprising correlating the geospatial (three-dimensional) coordinates of the database with floor plan information of a particular building, wherein the predicting of the signal strength is further based on a predicted location of the particular mobile device with respect to said floor plan information within the particular building.

13. The computer program product as recited in claim 9, wherein the database is built using location information including whether a signal boost system exists proximate and area associated with said particular set of said three-dimensional, geospatial coordinates.

14. The computer program product as recited in claim 9, wherein the predicting, using the database, said signal strength for said particular mobile device at said particular set of said three-dimensional, geospatial coordinates includes predicting a boundary around said particular set of said three-dimensional, geospatial coordinates, wherein said boundary defines an area having a comparable signal strength to said signal strength.

15. A computer system, comprising:
a processor;
a memory coupled to said processor; and
a computer readable storage device coupled to the processor, the storage device containing instructions executable by the processor via the memory to implement a method for predicting mobile device signal strength, the method comprising the steps of:
building a database of mobile signal information, the mobile signal information including signal strength for a plurality of mobile devices, the plurality of mobile devices being located at a plurality of three-dimensional, geospatial coordinates and utilizing a plurality of mobile signal providers/carriers, the mobile signal information further including a past condition associated with the signal strength, wherein the past condition is at least one of time of day, weather, vegetation, and power level;
predicting, using the database of mobile signal information, a signal strength for a particular mobile device at a particular set of said three-dimensional, geospatial coordinates of the plurality of three-dimensional, geospatial coordinates, for at least one of a current time and a future time, utilizing a particular mobile signal provider/carrier, wherein said predicting includes comparing the past condition with at least one of a current condition and an expected future condition;
notifying a user of said predicted signal strength for said particular mobile device at said particular set of three-dimensional, geospatial coordinates for at least one of said current time and said future time;
observing an actual signal strength at the respective said current time or said future time; and
comparing said observed actual signal strength with said predicted signal strength and using said comparing to improve future predicting using the database.

16. The computer system as recited in claim 15, wherein the database is built using: (i) signal maps from the providers/carriers, (ii) crowdsourced mobile signal data, including geospatial (three-dimensional) coordinates and signal strength, from mobile devices utilizing the providers/carriers, and (iii) social media posts and ratings pertaining to the signal strength of particular providers/carriers and of particular locations.

17. The computer system as recited in claim 15, further comprising:
recommending a user action designed to result in an improved predicted signal strength compared to said predicted signal strength.

18. The computer system as recited in claim 15, further comprising correlating the geospatial (three-dimensional) coordinates of the database with floor plan information of a particular building, wherein the predicting of the signal strength is further based on a predicted location of the particular mobile device with respect to said floor plan information within the particular building.

* * * * *